United States Patent
Jones et al.

(10) Patent No.: US 10,346,798 B2
(45) Date of Patent: *Jul. 9, 2019

(54) SYSTEMS AND METHODS FOR DETECTING MISSING LABELS

(71) Applicant: Walmart Apollo, LLC, Bentonville, AR (US)

(72) Inventors: Nicholaus Adam Jones, Fayetteville, AR (US); Matthew Allen Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/977,463

(22) Filed: May 11, 2018

(65) Prior Publication Data

US 2018/0260773 A1    Sep. 13, 2018

Related U.S. Application Data

(63) Continuation of application No. 15/649,890, filed on Jul. 14, 2017, now Pat. No. 9,996,820.

(60) Provisional application No. 62/374,404, filed on Aug. 12, 2016.

(51) Int. Cl.
| | |
|---|---|
| *G06K 15/00* | (2006.01) |
| *G06Q 10/08* | (2012.01) |
| *G06K 17/00* | (2006.01) |
| *G01S 5/04* | (2006.01) |

(52) U.S. Cl.
CPC ........... *G06Q 10/087* (2013.01); *G06Q 10/08* (2013.01); *G01S 5/04* (2013.01); *G06K 2017/0051* (2013.01)

(58) Field of Classification Search
CPC .. G01S 5/04; G06K 2017/0051; G06Q 10/08; G06Q 10/087
See application file for complete search history.

(56) References Cited

U.S. PATENT DOCUMENTS

| | | |
|---|---|---|
| 6,885,287 B2 | 4/2005 | Haulk et al. |
| 7,347,361 B2 | 3/2008 | Lovett |
| 7,543,741 B2 | 6/2009 | Lovett |

(Continued)

FOREIGN PATENT DOCUMENTS

WO    2012095825 A2    7/2012

OTHER PUBLICATIONS

International Search Report and Written Opinion from related international patent application No. PCT/US2017/042107 dated Sep. 22, 2017.

*Primary Examiner* — Seung H Lee
(74) *Attorney, Agent, or Firm* — McCarter & English, LLP; David R. Burns (57) ABSTRACT

Described in detail herein are methods and systems for detecting missing or miss positioned labels. The system can include a portable scanning device to scan machine-readable elements included on labels at a first and second location. The portable scanning device can detect the acceleration and the cumulative change between the first and second location. The portable scanning device or a computing system can determine the distance between the first and second location based on the acceleration data. The computing system can place a data point on a map of an estimated location of the location of the first scan and the location of the second scan.

19 Claims, 5 Drawing Sheets

(56) References Cited

U.S. PATENT DOCUMENTS

| | | |
|---|---|---|
| 7,699,226 B2 | 4/2010 | Smith et al. |
| 7,810,720 B2 | 10/2010 | Lovett |
| 8,189,855 B2 | 5/2012 | Opalach et al. |
| 8,941,645 B2 | 1/2015 | Grimaud |
| 9,996,820 B2 * | 6/2018 | Jones ................... G06Q 10/087 |
| 2001/0000019 A1 | 3/2001 | Bowers et al. |
| 2006/0015408 A1 | 1/2006 | Brown |
| 2006/0085295 A1 | 4/2006 | Droste et al. |
| 2009/0231135 A1 | 9/2009 | Chaves et al. |
| 2012/0233041 A1 | 9/2012 | O'Dell et al. |
| 2013/0173435 A1 | 7/2013 | Cozad, Jr. |
| 2015/0088703 A1 | 3/2015 | Yan |
| 2015/0220878 A1 | 8/2015 | Argue et al. |
| 2016/0021849 A1 | 1/2016 | Loosveld |

* cited by examiner

SYSTEMS AND METHODS FOR DETECTING MISSING LABELS

CROSS-REFERENCE TO RELATED PATENT APPLICATIONS

This application is a continuation of U.S. patent application Ser. No. 15/649,890, filed on Jul. 14, 2017 which claims priority to U.S. Provisional Application No. 62/374,404 filed on Aug. 12, 2016, the contents of which are incorporated by reference herein in their entirety.

BACKGROUND

Labels can be positioned erroneously throughout the facility. Keeping track of label positions disposed in large facilities can be a difficult and error-prone task.

BRIEF DESCRIPTION OF DRAWINGS

Illustrative embodiments are shown by way of example in the accompanying drawings and should not be considered as a limitation of the present disclosure.

DETAILED DESCRIPTION

Described in detail herein are methods and systems for detecting missing or misplaced labels. The system can include a portable scanning device in communication with a computing system, where the portable scanning device can be configured to scan machine-readable elements included on labels distributed in an environment and transmit information about the scanned machine-readable elements and information about the acceleration of the portable scanning device to the computing device. Using acceleration data generated by the portable scanning device, the portable scanning device or the computing system can determine the distance between sequentially scanned machine-readable elements and the computing system can place data points on a map of estimated scan locations. The computing system can determine expected locations of the machine-readable elements and can determine whether machine-readable elements are missing or misplaced.

Embodiments of the portable scanning device include one or more readers, one or more accelerometers, memory, and one or more controllers. The reader(s) can be configured to read one or more machine-readable elements, extract identifiers encoded in the machine-readable elements, and store the identifiers in memory. The accelerometer(s) can be configured to sense accelerations of the portable scanning device in one or more dimensions and to store the sensed accelerations in memory as acceleration data. The controller can be operatively coupled to the reader(s), the accelerometer(s), and the memory, and can be configured to control the reader to read a first machine-readable element disposed at a (first) location, control the reader to read a second machine-readable element disposed at a second location, and determine a cumulative change in the acceleration data from the first location to the second location as a result of movement of the portable scanning device from the first location to the second location and in response to the reading of the second machine-readable element.

At least one of the controller or the computing system can determine an estimated distance travelled by the portable scanning device between readings (e.g., from the first location to the second location) based on the cumulative change in the acceleration data between consecutive readings. The computing system is programmed to determine whether the second machine-readable element is located at a designated/expected location based on a difference between the estimated distance and an expected distance between the first and second locations at which the first and second machine-readable elements were read, where the expected distance between the first and second locations can be determined based on a planogram.

In accordance with embodiments of the present disclosure, the computing system can be configured to determine that the second machine-readable element is located at the designated location in response to determining that the difference between the relative distance and the expected distance is less than a threshold percentage.

In accordance with embodiments of the present disclosure, the computing system is configured to determine that the second machine-readable element is misplaced in response to determining that the difference between the relative distance and the expected distance exceeds a threshold percentage. In response to determining the difference between the relative distance and the expected distance exceeds the threshold percentage, the computing system can transmit an alert.

The computing system includes a database storing a map, and the computing system can retrieve the map to determine the expected distance between the first and second machine-readable elements. In response to determining the relative distance travelled by the portable scanning device between reading the first and second machine-readable elements (e.g., from the first location to the second location), the controller resets a memory location associated with the acceleration data.

The controller of the portable scanning device can be configured to control the reader to read a third machine-readable elements disposed at a third location, and determine a cumulative change in the acceleration data between reading the second and third machine-readable elements (e.g., from the second location to the third location) as a result of movement of the portable scanning device from the second location to the third location and in response to the reading of the third machine-readable element.

In accordance with embodiments of the present disclosure, the accelerometer of the portable scanning device can be a multi-axis accelerometer, and the relative distance between the reading can be determined based on movement of the portable scanning device in two or more axes.

Figure 1A:
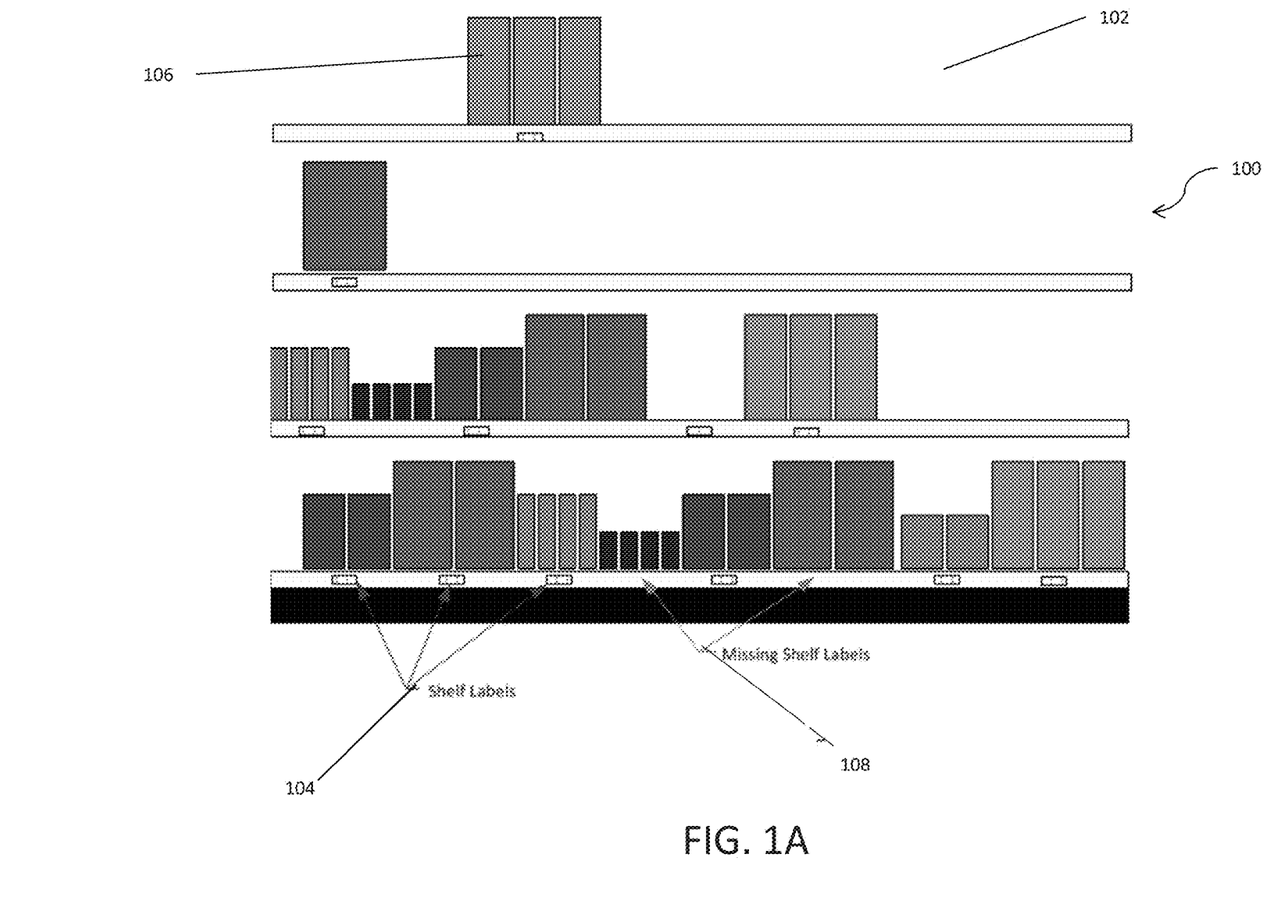
FIG. 1A is a block diagram of an exemplary shelving unit disposed in a facility according to the present disclosure.

FIG. 1A is a block diagram of an exemplary shelving unit 102 disposed in a facility 100 according to the present disclosure. The shelving unit 102 can hold, store and support sets of physical objects 106. Machine-readable elements 104 can be disposed on the front face of the shelving unit 102. Each machine-readable elements 104 can be encoded with a unique identifier associated with one or more of the sets of physical objects 106, which can be disposed directly below or directly above a corresponding one of the machine-readable elements 104. The machine-readable elements can be included on labels affixed to the shelving unit 102. Some of labels associated with some of the sets of physical object can be missing from or misplaced one the shelving unit (e.g., missing labels 108). For example, a set of like physical objects 106 may have a label with an associated machine-readable element, but the label may not have be placed on the shelving unit 102, may have been removed from the shelving unit 102, and/or may have been placed on the shelving unit at an incorrect location. In some embodiments, the machine-readable elements on the labels can be barcodes or QR codes.

Figure 1B:
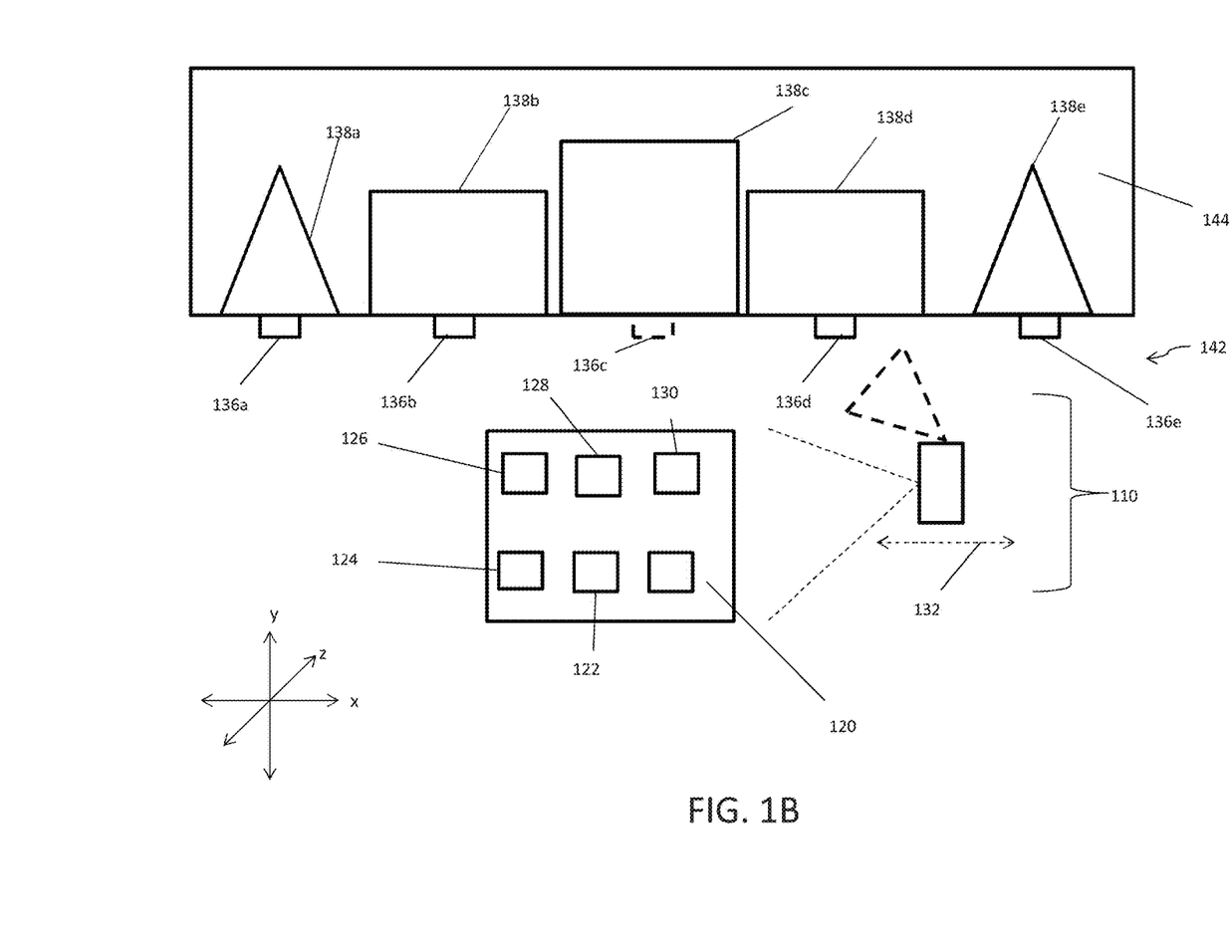
FIG. 1B is a block diagram of an embodiment of a portable scanning device.

FIG. 1B is a block diagram of an embodiment of a portable scanning device 110 that can be used to read machine-readable elements on the labels affixed a shelving unit 144 in accordance with the present disclosure. The portable scanning device 110 can include a controller 130, an image capturing device 128, a reader 126, an accelerometer 122, a gyroscope 134, and a memory 124. The reader 126 can be an optical reader, RF reader or any other device using Near Field Communication (NFC) technology. The accelerometer 122 can be a single or multi-axis accelerometer and can sense acceleration with respect to the axes of the accelerometer. The accelerometer can detect components of the acceleration including a magnitude of acceleration and a direction of acceleration. As one example, the accelerometer can be a three-axis accelerometer that senses accelerations of the portable scanning device 110 with respect to the three axes (e.g., x, y and z axes). The accelerometer 122 can determine the acceleration of the portable scanning device with respect to each axis (e.g., the magnitude and directional components of the acceleration along the axes). The gyroscope 134 can determine the, orientation, position, tilt, pitch, yaw, and roll of the portable scanning device 110. As one example, the gyroscope 134 can have three-axes and can senses a rate of rotation of the portable scanning device 110 with respect to the three axes (e.g., x, y and z axes), and can output electrical signals corresponding to the rate of rotation, which can be used to determine an orientation of the portable scanning device 110.

The controller 130 can control the reader 126 to read machine-readable elements 136a-e on labels affixed to the shelving unit 144 and decode identifiers encoded in the machine-readable elements 136a-e. For example, the controller 130 can control the reader 126 to read a first machine-readable element 136a and decode the identifier from the machine-readable element associated with the physical object 138a. Upon scanning the first machine-readable element 136a, the portable scanning device 110 can be moved with respect to an x-axis, a y-axis, and a z-axis. For example, the reader 126 can be moved along the x-axis as indicated by the arrow 132, and the controller 130 can control the reader 126 to scan a second machine-readable element 136b associated with a physical object 138b. The reader 126 can decode the machine-readable element 136b to extract an identifier encoded therein. Upon scanning the second machine-readable element 136b, the portable scanning device 110 can be moved to scan machine-readable element 136d (e.g., since machine-readable element 136c is missing). The decoded identifiers can be stored in the memory 130.

In response to the portable scanning device 110, reading the first machine-readable element, the accelerometer 122 can sense acceleration of the portable scanning device 110 as it is moved to read the second machine-readable element and output acceleration data corresponding to the sensed acceleration (e.g., magnitude and direction over time). For example, if the location at which the second reading occurs is below the location at which the first reading occurs, the accelerometer 122 can sense an acceleration of the portable scanning device 110 along the y-axis. If the location at which the second reading occurs is to the right of the location at which the first scan occurred, the accelerometer 122 can sense the acceleration of portable scanning device 110 along the x-axis. Depending on the movement of the portable scanning device, the acceleration sensed by the accelerometer 122 can have x, y, and z components. The controller 130 can determine a cumulative change in the acceleration data from the location at which the machine-readable element 136a is read to the location at which the machine-readable element 136b is read, and can determine a cumulative change in the acceleration data from the location at which the machine-readable element 136b is read, and the location at which the machine-readable element 136d is read as a result of movement of the portable scanning device. The portable scanning device 110 can transmit the cumulative changes in the acceleration data to a computing system. In some embodiments, the portable scanning device 110 can calculate a relative distance travelled by the portable scanning device 110 from the location at which the machine-readable element 136a is read to the location at which the machine-readable element 136b is read (e.g., relative to the x, y, and z axes of the accelerometer), and can calculate a relative distance travelled by the portable scanning device 110 from the location at which the machine-readable element 136b is read and the location at which the machine-readable element 136d is read (e.g., relative to the x, y, and z axes of the accelerometer) based on the cumulative change in the acceleration data and in response to consecutive readings of machine-readable elements.

The output of the gyroscope 134 can be used by the controller to 130 to determine the angle at which the portable scanning device 110 is disposed. The controller 130 can compensate the measured distance using the determined angle at which the portable scanning device 110 is disposed. For example, the portable scanning device 110 can be disposed at a first angle at a first location and move towards along the x-axis to a second location and be disposed at a second angle along the y-axis. The accelerometer 122 can detect a change of the portable scanning device 110 moving along the x-axis and the y-axis based on the movement of the portable scanning device 110. The controller 130 can eliminate the change along the y-axis when calculating the distance traveled by the portable scanning device 110 based on the detection of the change in angle of the portable scanning device 110 detected by the gyroscope 122.

In some embodiments, the image capturing device 128 can capture an image of the machine readable elements 136a-e. The gyroscope 134 can detect the angle at which the portable scanning device is disposed in response to the image capturing device 128 capturing the machine-readable elements 136a-e. The portable scanning device 110 can transmit the detected angle to the computing system to determine whether the labels displaying the machine-readable elements 136a-e are disposed at the correct angle.

Figure 2:
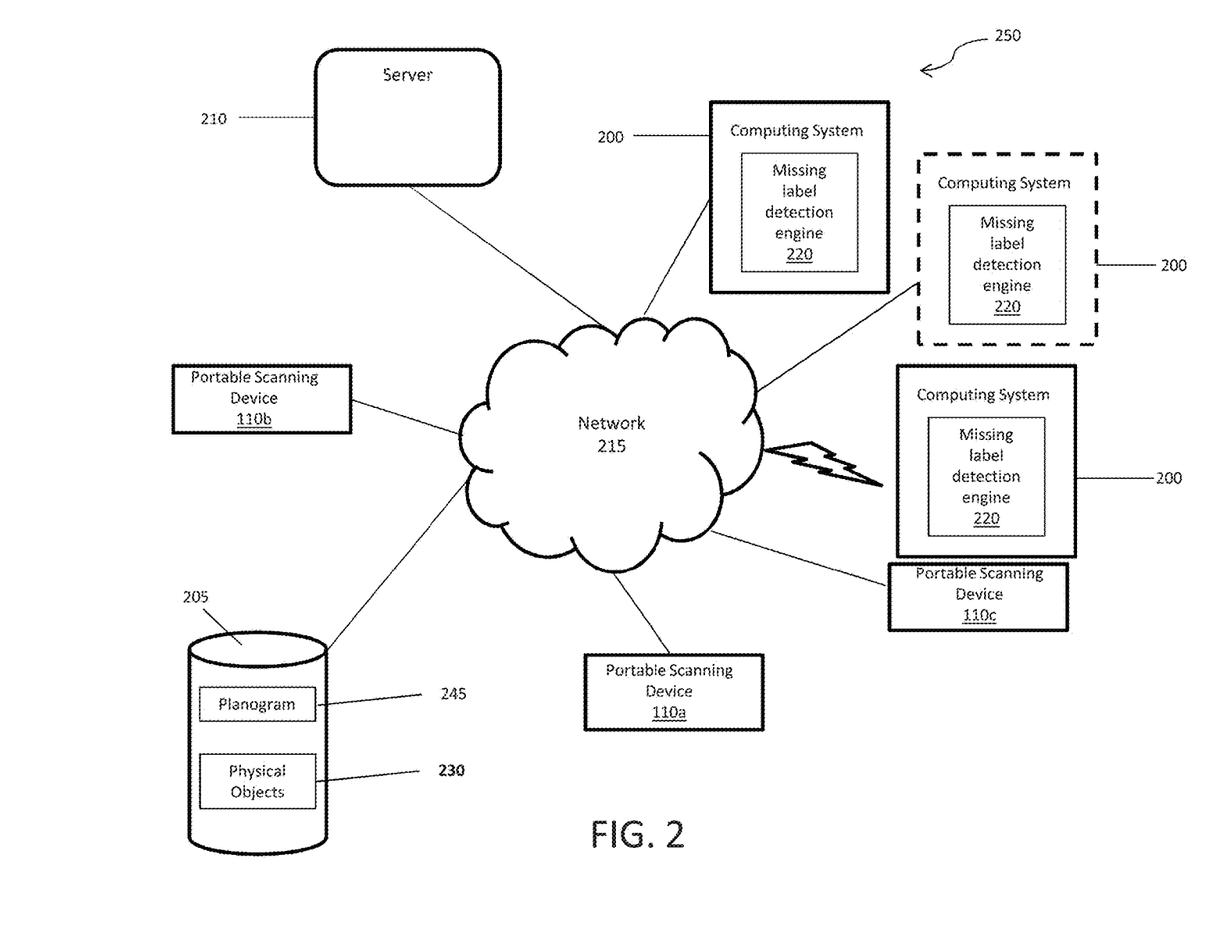
FIG. 2 illustrates an exemplary missing label detection system in accordance with exemplary embodiments of the present disclosure.

FIG. 2 illustrates an exemplary missing label detection system 250 according to exemplary embodiments. The system 250 can include one or more databases 205, one or more servers 210, one or more computing systems 200, and portable scanning devices 110a-c configured to scan machine-readable labels as described herein. In exemplary embodiments, the computing system 200 is in communication with the databases 205, a server 210, and portable scanning devices 110a-c, via a communications network 215. The computing system 200 can implement at least one instance of the missing label detection engine 220.

In an example embodiment, one or more portions of the communications network 215 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The server 210 includes one or more computers or processors configured to communicate with the computing system 200 and the databases 205, via the network 215. The server 210 hosts one or more applications configured to interact with one or more components computing system 200 and/or facilitates access to the content of the databases 205. The databases 205 may store information/data, as described herein. For example, the databases 205 can include a physical object database 230 and a planogram database 245. The physical object database 230 can store information about physical objects and can include association between the identifier encoded in the machine-readable elements and the information about the physical objects stored in the database 230. The planogram database 245 can store designated one or more planogram including location information for the machine-readable elements and the corresponding physical objects disposed in the facility. The databases 205 and server 210 can be located at one or more geographically distributed locations from each other or from the computing system 200. Alternatively, the databases 205 can be included within server 210.

In exemplary embodiments, the computing system 200 can receive acceleration data of a portable scanning device and the identifiers extracted from the machine-readable elements read by the portable scanning device. The acceleration data can be the cumulative change in acceleration and the direction traveled by the portable scanning device between pairs of consecutively read machine-readable elements. The computing system 200 can execute the missing label detection engine 220 to determine a distance and direction traveled by the portable scanning device from one location at which a machine-readable element to another location at which another machine-readable element is read based on the acceleration data output by the accelerometer of the portable scanning device as the portable scanning device moves between the locations.

For example, the portable scanning device can transmit a first identifier extracted from a machine-readable element at a first location and can reset the stored accelerometer data so that the first location corresponds to an origin. The portable scanning device can be moved to a second location at which a second machine-readable element can be scanned, and as the portable scanning device is moved acceleration data can be stored. When the portable scanning device reads the second machine-readable element, the acceleration data corresponding to the movement of the portable scanning device from the first location to the second location can be analyzed to estimate a distance and direction the portable scanning device traveled to arrive at the second location from the first location. The computing system 200 can execute the missing label detection engine 220 to place a data point of the estimated location of the first scan and a data point of the estimated location of the second scan based on the determined distance traveled between the first location and the second location. Based on this, the computing device can execute the missing label detection engine 220 to determine a relative location of the first machine-readable element to the second machine-readable element in three-dimensional space. After the second machine readable element is read, the portable scanning device can reset the acceleration data to set that the second location now corresponds to an origin. The portable scanning device can be moved to a third location at which a third machine-readable element can be scanned, and as the portable scanning device is moved acceleration data can be stored. When the portable scanning device reads the third machine-readable element, the acceleration data corresponding to the movement of the portable scanning device from the second location to the third location can be analyzed to estimate a distance and direction the portable scanning device traveled to arrive at the third location from the second location. The computing system 200 can execute the missing label detection engine 220 to place a data point of the estimated location of the third scan based on the determined distance and direction traveled from the second location and the third location. Based on this, the computing device can execute the missing label detection engine 220 to determine a relative location of the third machine-readable element to the second machine-readable element and/or the first machine-readable element in three-dimensional space. As the portable scanning device continues to be moved and to read machine-readable elements, a three-dimensional mapping of the relative locations of the machine-readable elements is formed.

For each identifier extracted from the read machine-readable identifiers, the computing device 200, executing the missing label detection engine 220, can query the physical objects database 230 (using the received identifiers) to retrieve the identification of the physical objects associated with the identifiers. The computing system, executing the missing label detection engine 220, can query the planogram database 245 using the identification of the first and second physical object to retrieve the designated location of the machine-readable elements associated with the identifiers respectively. The computing system 200, executing the missing label detection engine 220, can compare the relative locations of the data points generated based on the readings with the designated locations of the machine-readable elements defined in the planogram to determine whether the machine-readable elements are disposed in the correct locations.

As a non-limiting example, the missing label detection system 250 can be implemented in a retail environment. Machine-readable elements can be included on labels and disposed underneath or above the associated set of like products for sale. Each set of like products and machine-readable element can have a designated location within the retail store stored in one or more planograms stored in the planogram database 245. The computing system 200 can receive a first identifier decoded from a first machine-readable element read by a portable scanning device at a first location. The first identifier can be associated with a first product. The computing system 200 can further receive a second identifier decoded from a second machine-readable element read by the portable scanning device. The second identifier can be associated with a second product. The computing system 200 can receive acceleration data from the portable scanning device based on the movement of the portable scanning device between the first and second scan. Based on the acceleration data the computing system can place a data point at the first location of the first scan of the first machine-readable element relative to the second location of the second scan of the second machine-readable element. The computing system 200 can query the physical objects database 230 using the first and second identifiers to determine the identification of the first and second product associated with the first and second identifiers respectively. The computing system 200 can query the planogram database 245 to retrieve the designated location of the first and second labels which include the first and second machine-readable elements, respectively. The computing system 200 can compare the designated location of the first and second label and to the data points of the first and second scans of the first and second machine-readable elements, respectively. Based on the comparison the computing system 200 can determine whether the first and second label are in the correct locations and positions. In some embodiments the first or second label can be disposed incorrectly on a shelving/storage unit. In other embodiments, the first or second labels can be disposed on the incorrect shelving/storage unit altogether.

In some embodiments, the memory stores the acceleration data and/or distance information each time the portable scanning device scans a machine-readable element. The controller of the portable scanning device can reset and erase the saved acceleration and/or distance data after a predetermined amount of time, a predetermined amount of distance traveled, or after a machine readable elements have been read and the acceleration data and/or distance data has been transmitted to the computing system. As one example, the controller of the portable scanning device can reset the memory location(s) storing the acceleration and/or distance data if the portable scanning device has been idle for a predetermined amount of time. As another example, the accelerometer can determine the portable scanning device has traveled a predetermined amount of distance and the controller can reset memory and erase the saved acceleration and/or distance data.

Figure 3:
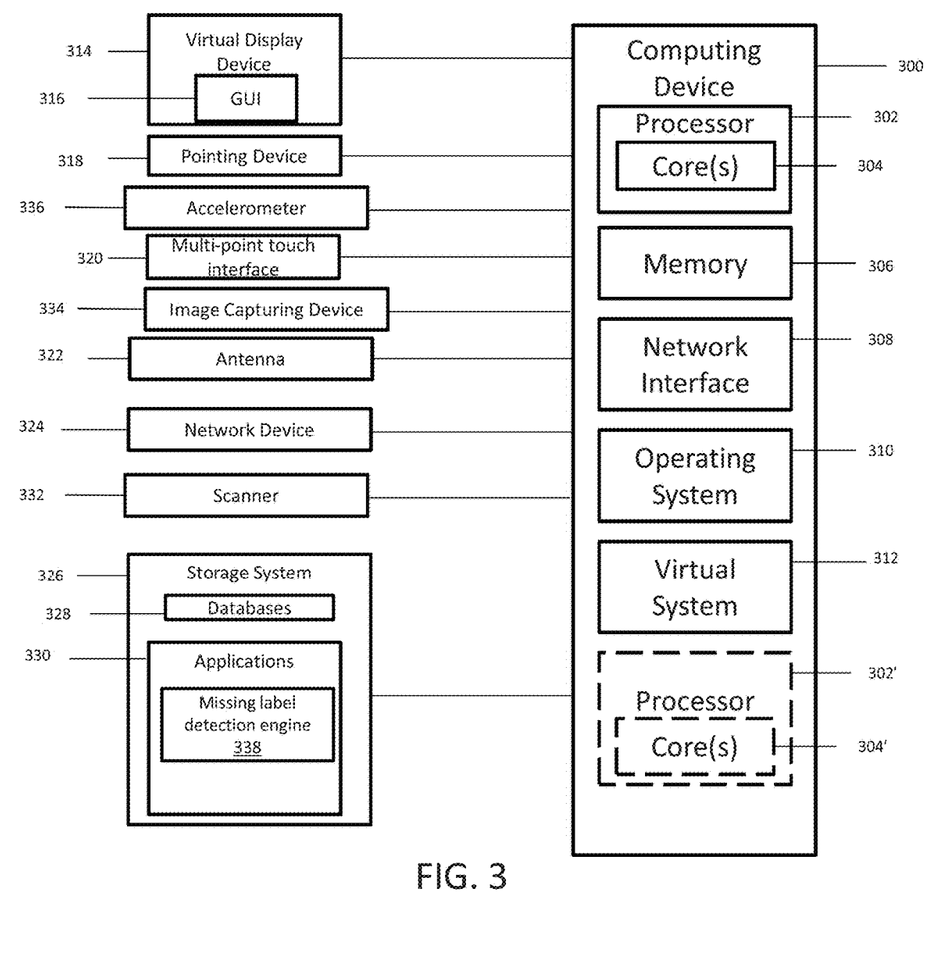
FIG. 3 illustrates an exemplary computing device in accordance with exemplary embodiments of the present disclosure.

FIG. 3 is a block diagram of an example computing device 300 for implementing exemplary embodiments of the present disclosure. Embodiments of the computing device 300 can implement embodiments of a missing label detection engine 338. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330 including the missing label detection engine 338) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments of the present disclosure. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

The computing device 300 can receive data from input/output devices such as, a reader 332, an image capturing device 334, and an accelerometer 336.

A user may interact with the computing device 300 through a visual display device 314, such as a computer monitor, which may display one or more graphical user interfaces 316, multi touch interface 320 and a pointing device 318.

The computing device 300 may also include one or more storage devices 326, such as a hard-drive, CD-ROM, or other computer readable media, for storing data and computer-readable instructions and/or software that implement exemplary embodiments of the present disclosure (e.g., applications). For example, exemplary storage device 326 can include one or more databases 328 for storing information regarding the physical objects and the applications 330 including the missing label detection engine 338. The databases 328 may be updated manually or automatically at any suitable time to add, delete, and/or update one or more data items in the databases. The databases 328 can include information such as database 245 and metrics database 230.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run any operating system 310, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 300 and performing the operations described herein. In exemplary embodiments, the operating system 310 may be run in native mode or emulated mode. In an exemplary embodiment, the operating system 310 may be run on one or more cloud machine instances.

Figure 4:
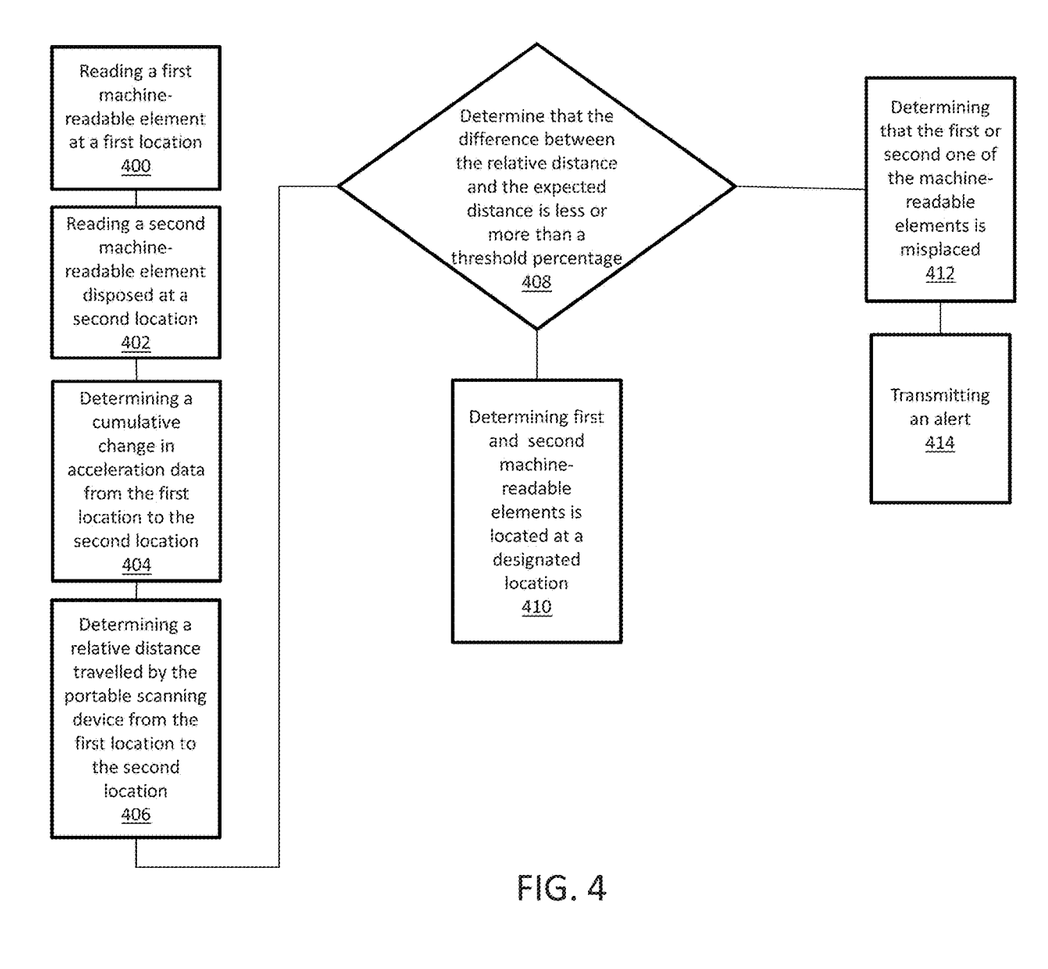
FIG. 4 is a flowchart illustrating a process implemented by a missing label detection system according to exemplary embodiments of the present disclosure.

FIG. 4 is a flowchart illustrating a process implemented by embodiments of the missing label detection system according to the present disclosure. In operation 400, a portable scanning device (e.g. portable scanning device 110 shown in FIG. 1B) can scan a first machine-readable element (e.g. machine-readable element 136a-e shown in FIG. 1B) in a first location associated to a first physical object (e.g. physical objects 138a-e shown in FIG. 1B). The portable scanning device can scan the machine-readable elements using a reader (e.g. reader 126 shown in FIG. 1B). The machine-readable elements can be included on a label disposed on a shelving unit (e.g. shelving unit 144 shown in FIG. 1B). Each machine-readable element can have an identifier encoded therein, and each identifier can be associated with a set of like physical object. The portable scanning device can decode the identifier from the machine-readable element upon reading the machine-readable element.

In operation 402, the portable scanning device can move and read a second machine-readable element at a second location associated with a second physical object. The accelerometer (e.g. accelerometer 122 shown in FIG. 1B) in the portable scanning device can detect the motion, direction and acceleration of portable scanning device. The accelerometer can be a multi-axis accelerometer and the multi-axis accelerometer can detect acceleration of the portable scanning device with respect to the x, y and z axis.

In operation 404, the portable scanning device can determine the cumulative change in acceleration from the first location and the second location. The cumulative change can be along one or more axis. In some embodiments, the portable scanning device can transmit the cumulative change to the computing system (e.g. the computing system shown in FIG. 2 200). In operation 406, the portable scanning device or the computing system can determine the distance (including a directional component) between the first location and the second location based on the cumulative change in acceleration. If the portable scanning device calculates the distance between the first and second location, the portable scanning device transmits the distance to the computing system.

In some embodiments, the portable scanning device can also transmit the identifiers encoded in the first and second machine-readable elements to the computing system. In response to receiving or determining the distance between the first and second locations and receiving the identifiers encoded in the first and second machine-readable elements, the computing system execute the missing label detection engine to determine a relative location of the first machine-readable element to the second machine-readable element and can place a data point for the first location and a data point for the second location in a map in three-dimensional space. The computing system can execute the missing label detection engine to query the physical objects (e.g. physical objects database shown in FIG. 2 230) database using the identifiers to retrieve the identification of the first and second set of like physical objects. The computing system can execute the missing label detection engine to query the planogram database (e.g. planogram database shown in FIG. 2 230) using the identification of the first and second set of like physical objects to retrieve the designated location of first and second machine-readable elements associated with the first and second set of like physical objects respectively.

In operation 408, the computing system, executing the missing label detection engine, can compare the data points of the first and second locations and the designated locations of the first and second machine-readable element to determine whether the distance between the first and second locations of the first and second machine-readable element exceeds or is less than a predetermined threshold percentage.

In operation 410, in response to determining the distance between the first and second locations is within a predetermined threshold percentage of the designated locations of the first and second machine-readable elements, the computing system can execute the missing label detection engine to determine the first and second machine-readable elements are disposed in the correct positions.

In operation 412, in response to determining the distance between the first and second locations exceeds or is less than a predetermined threshold percentage, the computing system can execute the missing label detection engine to determine either the first or second machine-readable element is misplaced and/or missing. In operation 414, the computing system execute the missing label detection engine to transmit an alert in response to determining the first or second machine-readable element are misplaced and/or missing.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A missing label detection system, the system comprising:
   a portable scanning device, the portable scanning device comprising:
      a reader configured to read machine-readable elements and output identifiers encoded in the machine-readable elements;
      an accelerometer configured to sense acceleration of the portable scanning device and output acceleration data corresponding to the sensed acceleration;
      a memory to store the identifiers and the acceleration data; and
      a controller operatively coupled to the reader, the accelerometer, and the memory, the controller configured to (i) control the reader to read a first one of the machine-readable elements disposed at a first location, (ii) control the reader to read a second one of the machine-readable elements disposed at a second location, and (iii) determines a cumulative change in the acceleration data from the first location to the second location as a result of movement of the portable scanning device from the first location to the second location and in response to the reading of the second one of the machine-readable elements; and a computing system in communication with the portable scanning device, wherein the computing system is programmed to determine whether the second one of the machine-readable elements is located at a designated location based on the cumulative change in the acceleration data from the first location to the second location.

2. The system of claim 1, wherein at least one of the controller or the computing system determines a relative distance travelled by the portable scanning device from the first location to the second location based on the cumulative change in the acceleration data between the first and second locations, and a difference between the relative distance and an expected distance between the first and second locations.

3. The system in claim 2, wherein the computing system is configured to determine that the second one of the machine-readable elements is located at the designated location in response to determining that the difference between the relative distance and the expected distance is less than a threshold percentage.

4. The system in claim 2, wherein the computing system is configured to determine that the second one of the machine-readable elements is misplaced in response to determining that the difference between the relative distance and the expected distance exceeds a threshold percentage.

5. The system in claim 4, wherein, in response to determining the difference between the relative distance and the expected distance exceeds the threshold percentage, the computing system transmits an alert.

6. The system in claim 2, wherein the computing system includes a database storing a map including the first and second locations, and the computing system retrieves the map to determine the expected distance.

7. The system of claim 2, wherein, in response to determining the relative distance travelled by the portable scanning device from the first location to the second location, the controller resets a memory location associated with the acceleration data.

8. The system of claim 7, wherein the controller of the portable scanning device is configured to (ii) control the reader to read a third one of the machine-readable elements disposed at a third location, and (iii) determine a cumulative change in the acceleration data from the second location to the third location as a result of movement of the portable scanning device from the second location to the third location and in response to the reading of the third one of the machine-readable elements.

9. The system of claim 1, wherein the accelerometer of the portable scanning device is a multi-axis accelerometer, and the relative distance between the first and second location is determined based on movement of the portable scanning device in at least two axes.

10. A missing label detection method, the method comprising:

controlling, a reader of a portable scanning device to read a first machine-readable element disposed at a first location;

controlling the reader to read a second machine-readable element disposed at a second location;

determining a cumulative change in acceleration data from the first location to the second location based on an output accelerometer of the portable scanning device as a result of movement of the portable scanning device from the first location to the second location and in response to the reading of the second one of the machine-readable elements; and determining whether the second machine-readable element is located at a designated location based on the cumulative change in acceleration data from the first location to the second location.

11. The method in claim 10, further comprising determining a relative distance travelled by the portable scanning device from the first location to the second location based on the cumulative change in the acceleration data between the first and second locations and a difference between the relative distance and an expected distance between the first and second locations.

12. The method in claim 11, further comprising determining that the second one of the machine-readable elements is located at the designated location in response to determining that the difference between the relative distance and the expected distance is less than a threshold percentage.

13. The method in claim 11, further comprising determining that the second one of the machine-readable elements is misplaced in response to determining that the difference between the relative distance and the expected distance exceeds a threshold percentage.

14. The method in claim 13, further comprising transmitting an alert in response to determining the difference between the relative distance and the expected distance exceeds the threshold percentage.

15. The method in claim 11, wherein a computing system in communication with the portable scanning device includes a database storing a map including the first and second locations, and the computing system retrieves the map to determine the expected distance.

16. The method of claim 11, further comprising resetting, via the controller, a memory location associated with the acceleration data in response to determining the relative distance travelled by the portable scanning device from the first location to the second location.

17. The method of claim 16, further comprising:

controlling, via the controller, the reader to read a third one of the machine-readable elements disposed at a third location; and determining, via the controller, a cumulative change in the acceleration data from the second location to the third location as a result of movement of the portable scanning device from the second location to the third location and in response to the reading of the third one of the machine-readable elements.

18. The method of claim 10, wherein the accelerometer of the portable scanning device is a multi-axis accelerometer, and the relative distance between the first and second location is determined based on movement of the portable scanning device in at least two axes.

19. A missing label detection system, the system comprising:

a portable scanning device, the portable scanning device comprising:

a reader configured to read machine-readable elements and output identifiers encoded in the machine-readable elements;

an accelerometer configured to sense acceleration of the portable scanning device and output acceleration data corresponding to the sensed acceleration;

a memory to store the identifiers and the acceleration data; and a controller operatively coupled to the reader, the accelerometer, and the memory, the controller configured to (i) control the reader to read a first one of the machine-readable elements disposed at a first location, (ii) control the reader to read a second one of the machine-readable elements disposed at a second location, and (iii) determines a cumulative change in the acceleration data from the first location to the second location as a result of movement of the portable scanning device from the first location to the second location and in response to the reading of the second one of the machine-readable elements;

a computing system in communication with the portable scanning device, wherein the computing system is programmed to:
   plot a first data point corresponding to the first location in a three-dimensional space;
   plot a second data point corresponding to the second location in the three-dimensional space;
   form a three-dimensional mapping of the first and second locations using the first and second data points;

wherein the computing system is programmed to determine whether the second one of the machine-readable elements is located at a designated location based on a difference between a relative distance between the first data point and the second data point in the three-dimensional mapping and an expected distance between the first and second locations.

* * * * *